US009111141B2

(12) United States Patent
Wang et al.

(10) Patent No.: US 9,111,141 B2
(45) Date of Patent: Aug. 18, 2015

(54) IMAGE PROCESSING APPARATUS, NON-TRANSITORY COMPUTER READABLE MEDIUM STORING PROGRAM, AND IMAGE PROCESSING METHOD

(75) Inventors: Chuan Wang, Kanagawa (JP); Takeshi Onishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 354 days.

(21) Appl. No.: 13/538,324

(22) Filed: Jun. 29, 2012

(65) Prior Publication Data

US 2013/0148892 A1   Jun. 13, 2013

(30) Foreign Application Priority Data

Dec. 12, 2011 (JP) ................. 2011-271203

(51) Int. Cl.
*G06K 9/46* (2006.01)
*G06K 9/00* (2006.01)
*G06T 7/00* (2006.01)
*G06K 9/62* (2006.01)

(52) U.S. Cl.
CPC .......... *G06K 9/00483* (2013.01); *G06K 9/6211* (2013.01); *G06T 7/0028* (2013.01); *G06T 2207/30176* (2013.01)

(58) Field of Classification Search
CPC ........... G06T 2207/10016; G06T 2207/30124; G06T 7/0012; G06K 9/48; G06K 9/6256; G06K 9/18; G06K 9/4647

USPC ......... 382/190, 159, 160, 201, 111, 131, 170, 382/209

See application file for complete search history.

(56) References Cited

U.S. PATENT DOCUMENTS

2008/0177764 A1* 7/2008 Kise et al. ..................... 707/100
2011/0002544 A1   1/2011 Oshima

FOREIGN PATENT DOCUMENTS

JP   2011-013890 A   1/2011

* cited by examiner

*Primary Examiner* — Ruiping Li
(74) *Attorney, Agent, or Firm* — Oliff PLC

(57) ABSTRACT

Provided is an image processing apparatus including a first specifying unit that specifies second feature point candidates, a second specifying unit that specifies second feature point candidates, an evaluating unit that generates evaluation information on evaluation of the second feature point candidate of a target first feature point based on the result of comparison between the relative position of the other first feature point to the target first feature point and the relative position of the second feature point candidate of the other first feature point to the second feature point candidate of the target first feature point, and a setting unit that sets the second feature point candidate of the target first feature point in accordance with the evaluation information as the second feature point corresponding to the target first feature point.

8 Claims, 15 Drawing Sheets

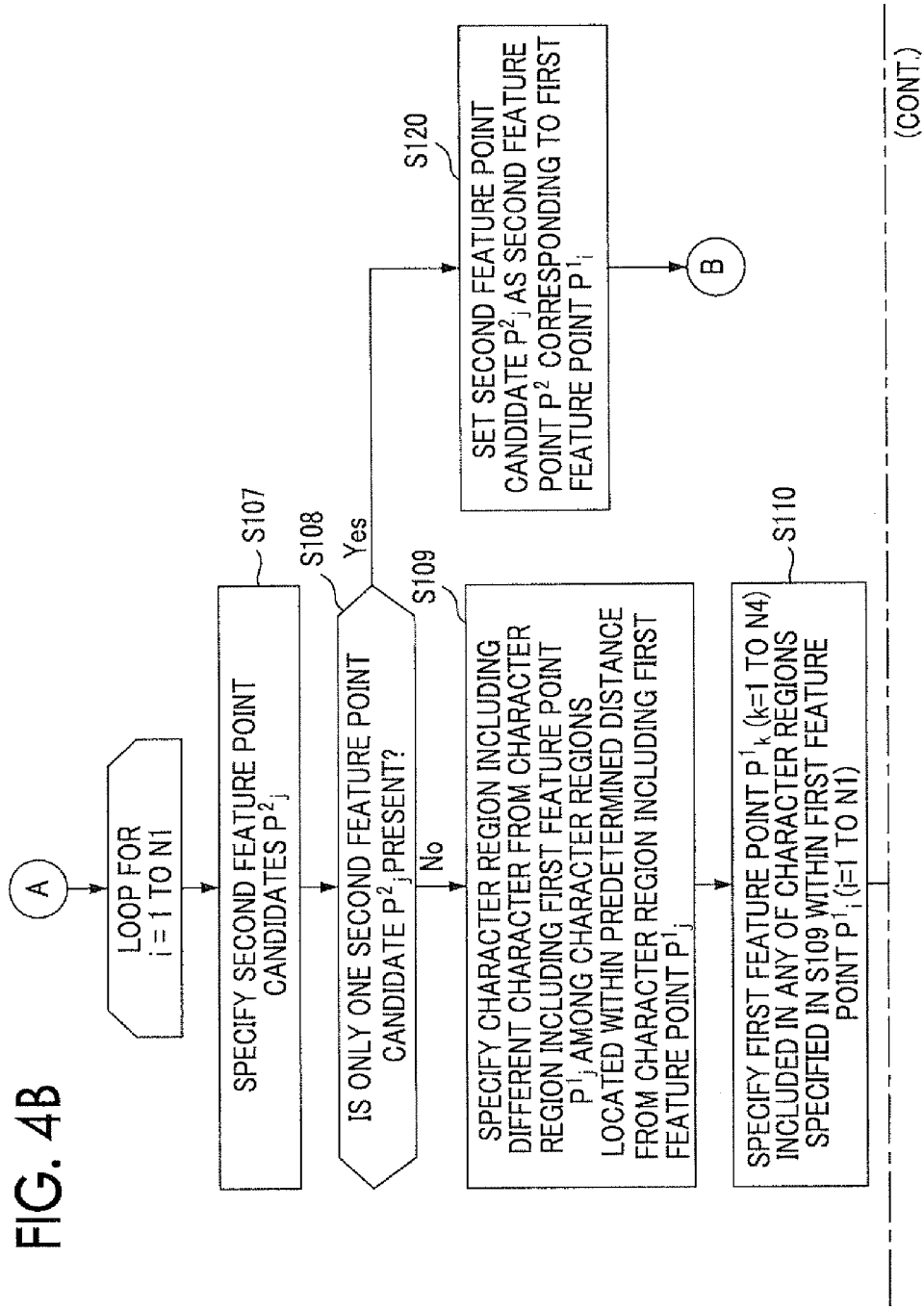

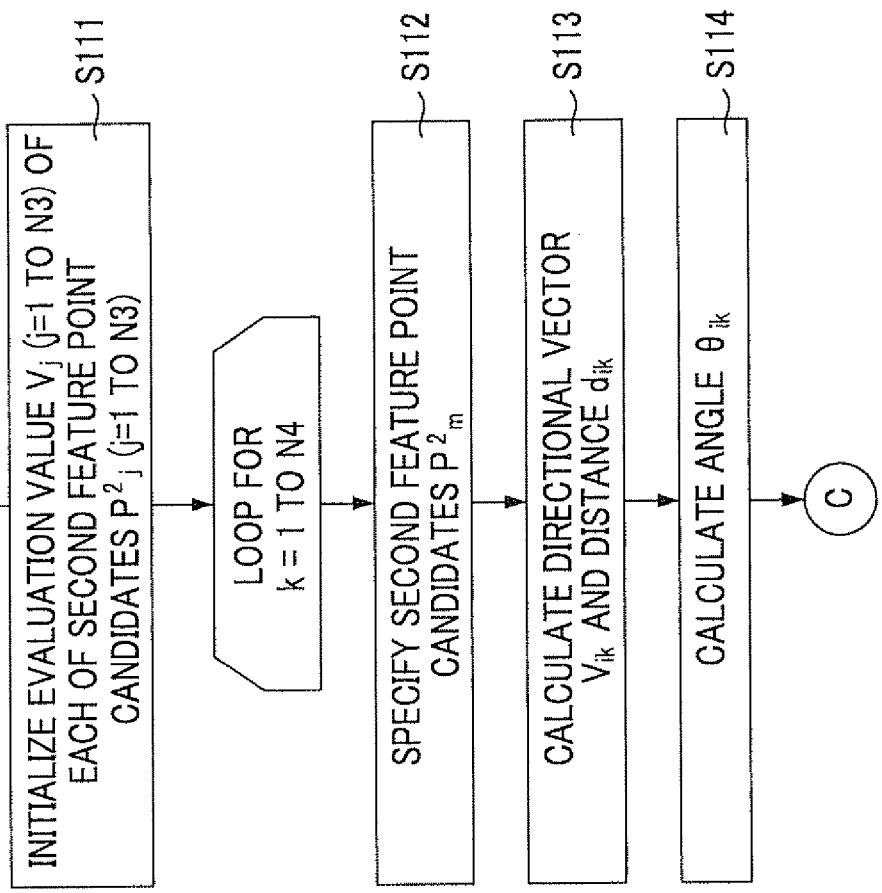

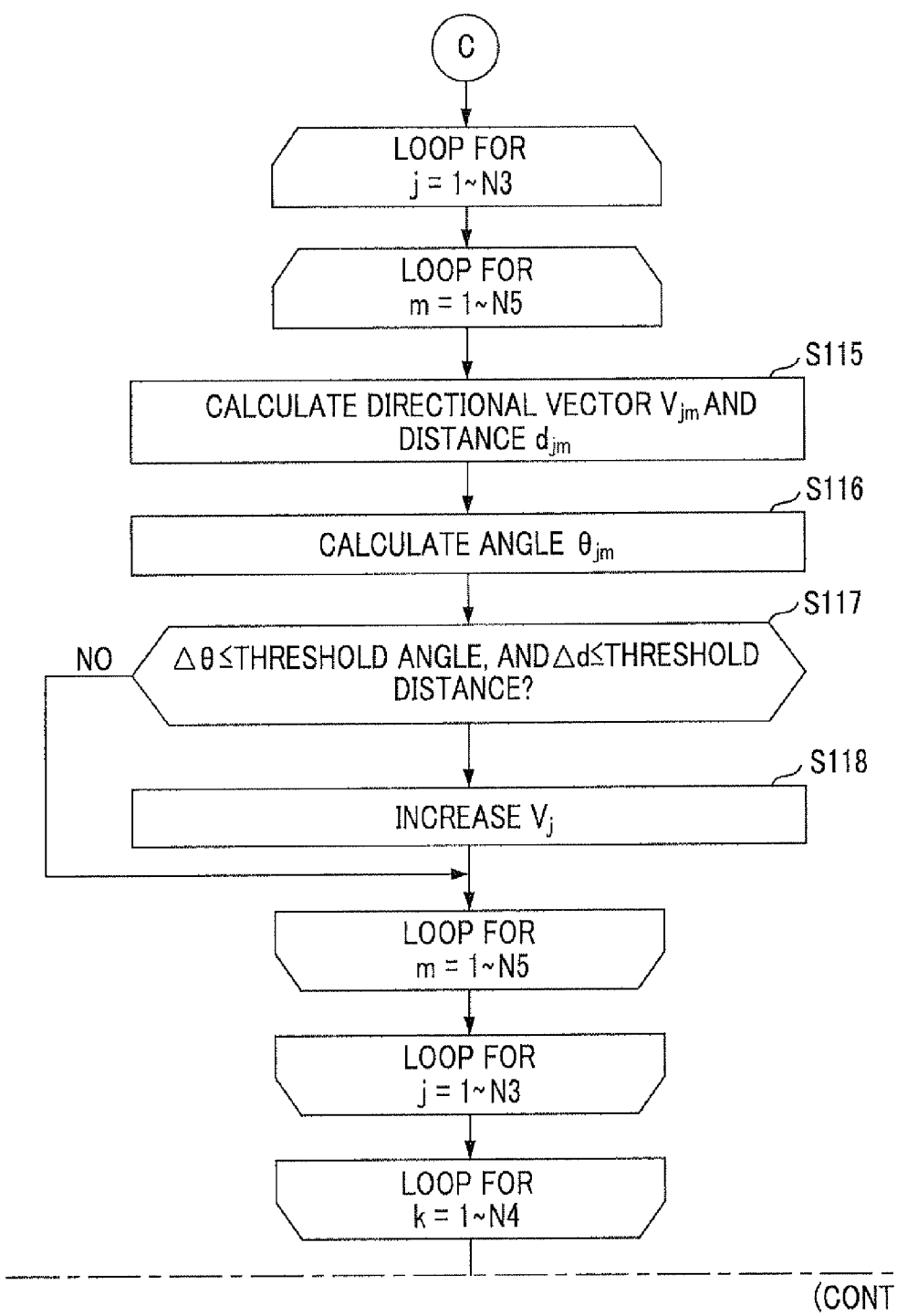

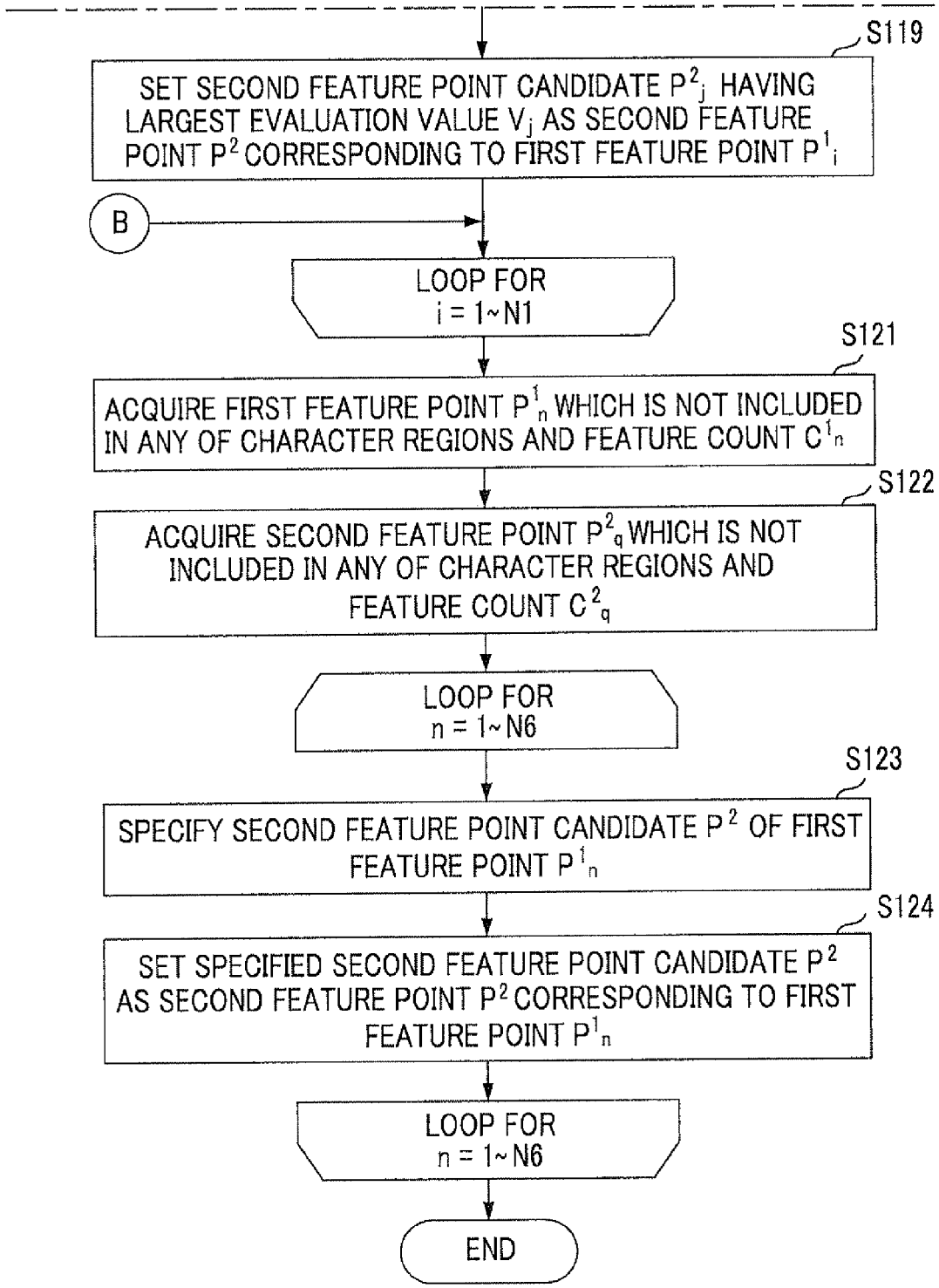

IMAGE PROCESSING APPARATUS, NON-TRANSITORY COMPUTER READABLE MEDIUM STORING PROGRAM, AND IMAGE PROCESSING METHOD

CROSS-REFERENCE TO RELATED APPLICATIONS

This application is based on and claims priority under 35 USC 119 from Japanese Patent Application No. 2011-271203 filed Dec. 12, 2011.

BACKGROUND

Technical Field

The present invention relates to an image processing apparatus, a non-transitory computer readable medium storing a program, and an image processing method.

SUMMARY

According to an aspect of the present invention, there is provided an image processing apparatus including: a first specifying unit that specifies second feature point candidates serving as the candidates for a second feature point corresponding to a target first feature point, which is one of plural first feature points extracted from a first image including plural character regions corresponding to characters, among plural second feature points extracted from a second image based on the result of comparison between a feature count representing image features at the target first feature point and a feature count representing image features at each of the plural second feature points; a second specifying unit that specifies second feature point candidates among the plural second feature points with respect to another first feature point included in a character region different from the target first feature point among the plural first feature points based on the result of comparison between a feature count representing image features at the other first feature point and a feature count representing image features at each of the plural second feature points; an evaluating unit that generates evaluation information on evaluation of the second feature point candidate of the target first feature point based on the result of comparison between the relative position of the other first feature point to the target first feature point and the relative position of the second feature point candidate of the other first feature point to the second feature point candidate of the target first feature point; and a setting unit that sets the second feature point candidate of the target first feature point in accordance with the evaluation information as the second feature point corresponding to the target first feature point. Current processes of combining document images fail to acceptably take into account corresponding feature points. The present invention relates to an apparatus, program, and method for acceptably combining related document images.

BRIEF DESCRIPTION OF THE DRAWINGS

Exemplary embodiments of the present invention will be described in detail based on the following figures, wherein:

FIG. 4B is a flowchart illustrating the process performed by the image processing apparatus;

FIG. 4C is a flowchart illustrating the process performed by the image processing apparatus;

DETAILED DESCRIPTION

Hereinafter, exemplary embodiments of the present invention will be described in detail with reference to the drawings.

Figure 1:
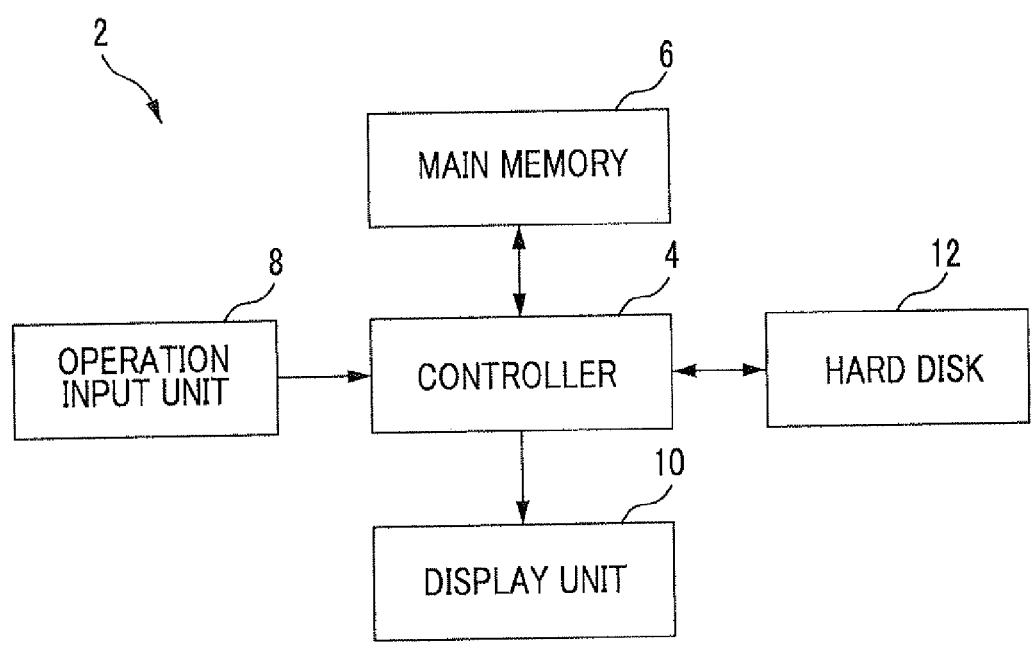
FIG. 1 is a diagram illustrating a configuration of an image processing apparatus.

FIG. 1 is a diagram illustrating the configuration of an image processing apparatus 2 according to an exemplary embodiment of the present invention. The image processing apparatus 2 is a general computer and includes a control unit 4, a main memory 6, an operation input unit 8, a display unit 10, and a hard disk 12.

The control unit 4 is a microprocessor and executes various types of information processing in accordance with a program stored in the main memory 6. The main memory 6 stores the program. The program may be read from a computer-readable information storage medium such as a DVD (registered trademark)-ROM and stored in the main memory 6, and may be supplied from a communication network and stored in the main memory 6. Moreover, various types of data necessary in the course of information processing are stored in the main memory 6.

The operation input unit 8 is an interface for allowing a user to perform input operations, for example a keyboard and mouse. The operation input unit 8 outputs a signal representing an operation input performed by the user, to the control unit 4. Moreover, the display unit 10 is a CRT display or a liquid crystal display, and outputs information input from the control unit 4.

Figure 2A:
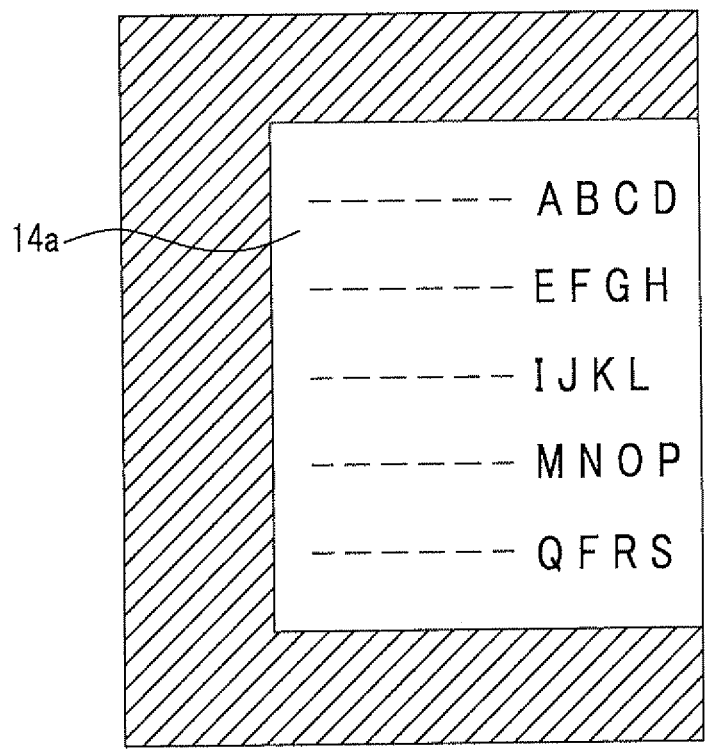
FIG. 2A is a diagram illustrating a first document image.
Figure 2B:
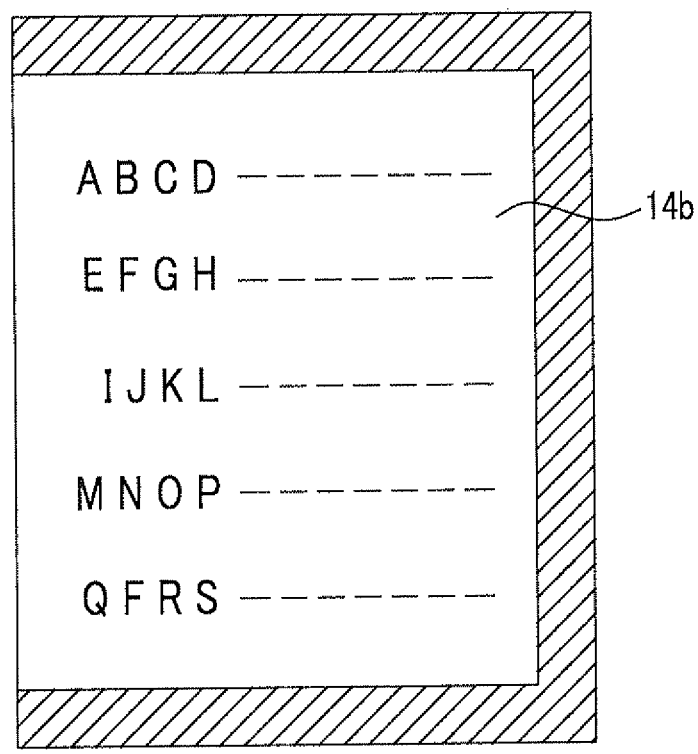
FIG. 2B is a diagram illustrating a second document image.
Figure 2C:
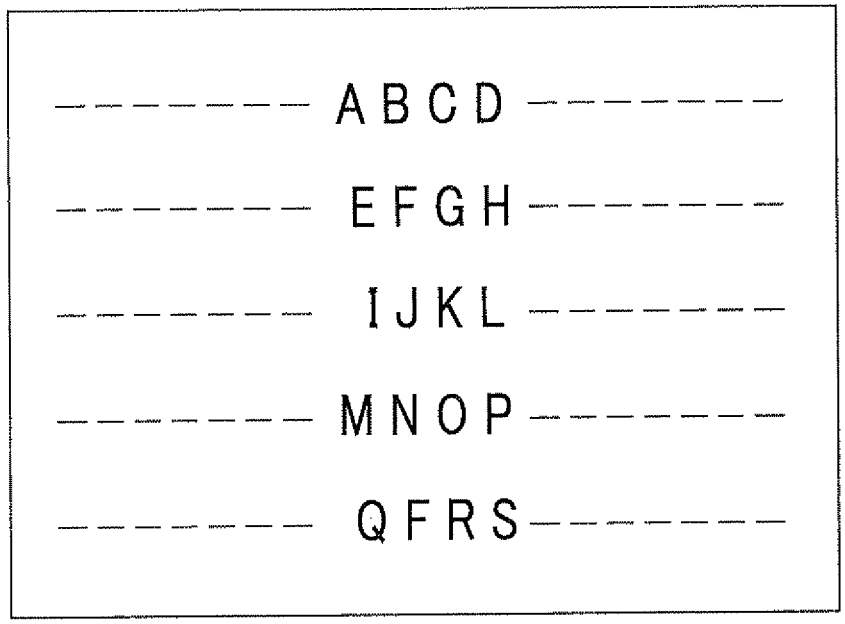
FIG. 2C is a diagram illustrating a document.

The hard disk 12 stores various types of information. In the case of the present exemplary embodiment, a first document image 14a and a second document image 14b which are bitmap images are stored on the hard disk 12. FIG. 2A illustrates the first document image 14a, and FIG. 2B illustrates the second document image 14b. The portion with hatched lines represents the background. As illustrated in FIGS. 2A and 2B, the left part of the document illustrated in FIG. 2C appears in the first document image 14a, and the right part of the document appears in the second document image 14b. Some portions appear in both the first and second document images 14a and 14b. Coordinate axes X and Y are set in the first and second document images 14a and 14b.

Figure 3A:
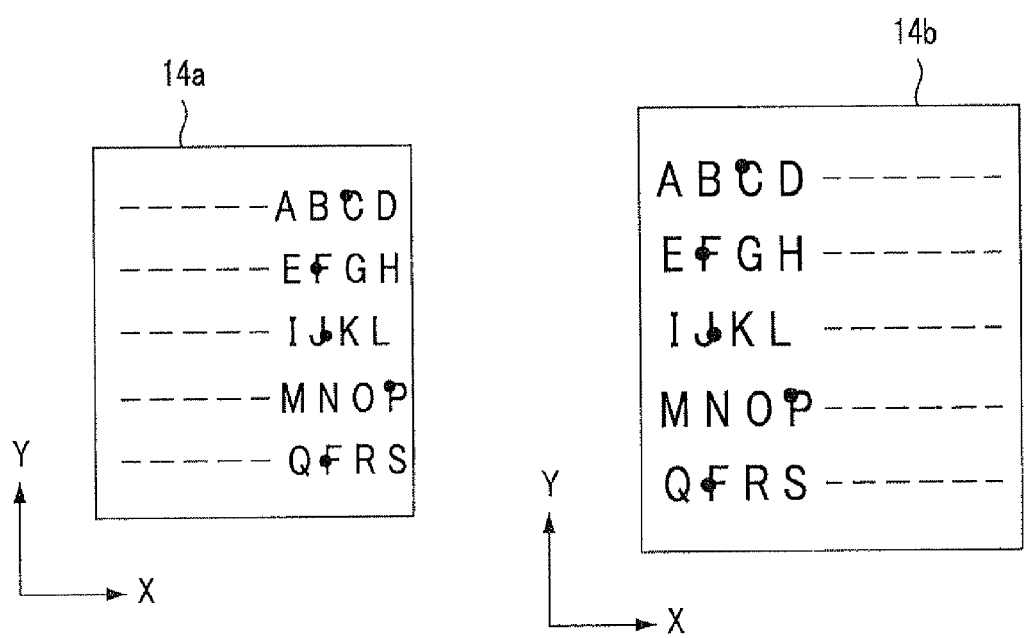
FIG. 3A is a diagram illustrating feature points.

In the image processing apparatus 2, feature points are extracted from the first and second document images 14a and 14b. FIG. 3A illustrates part of the extracted feature points. The respective points represent feature points.

Figure 3B:
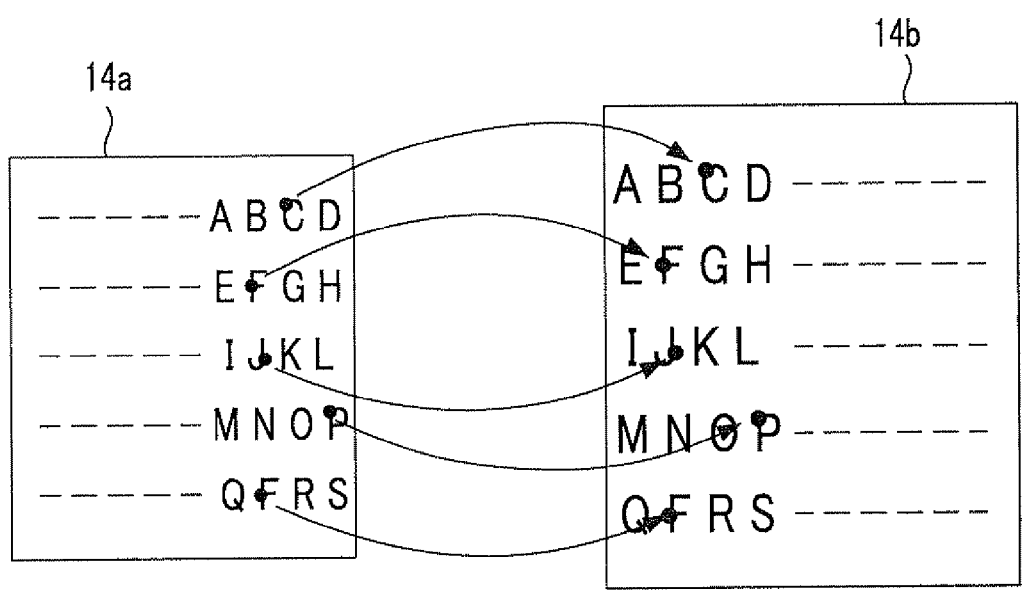
FIG. 3B is a diagram illustrating the correspondence between feature points.

Moreover, feature points in which similar feature counts are obtained between the first and second document images 14a and 14b are correlated with each other. That is, first feature points corresponding to respective feature points extracted from the first document image 14a are specified within the second document image 14b. FIG. 3B illustrates the correspondence between feature points.

Moreover, the first document image 14a is transformed so that one set of the correlated feature points is identical to the other set of feature points, and a combined document image is generated by combining the transformed first document image 14a with the second document image 14b. FIG. 20 illustrates the combined document image.

In the image processing apparatus 2, even when the second document image 14b includes plural feature points having feature counts similar to the feature points extracted from the first document image 14a (for example, the second document image 14b includes plural characters (for example, the character "F") included in the first document image 14a), the first feature points corresponding to the feature points extracted from the first document image 14a are specified with high accuracy. This will be described below.

Figure 4A:
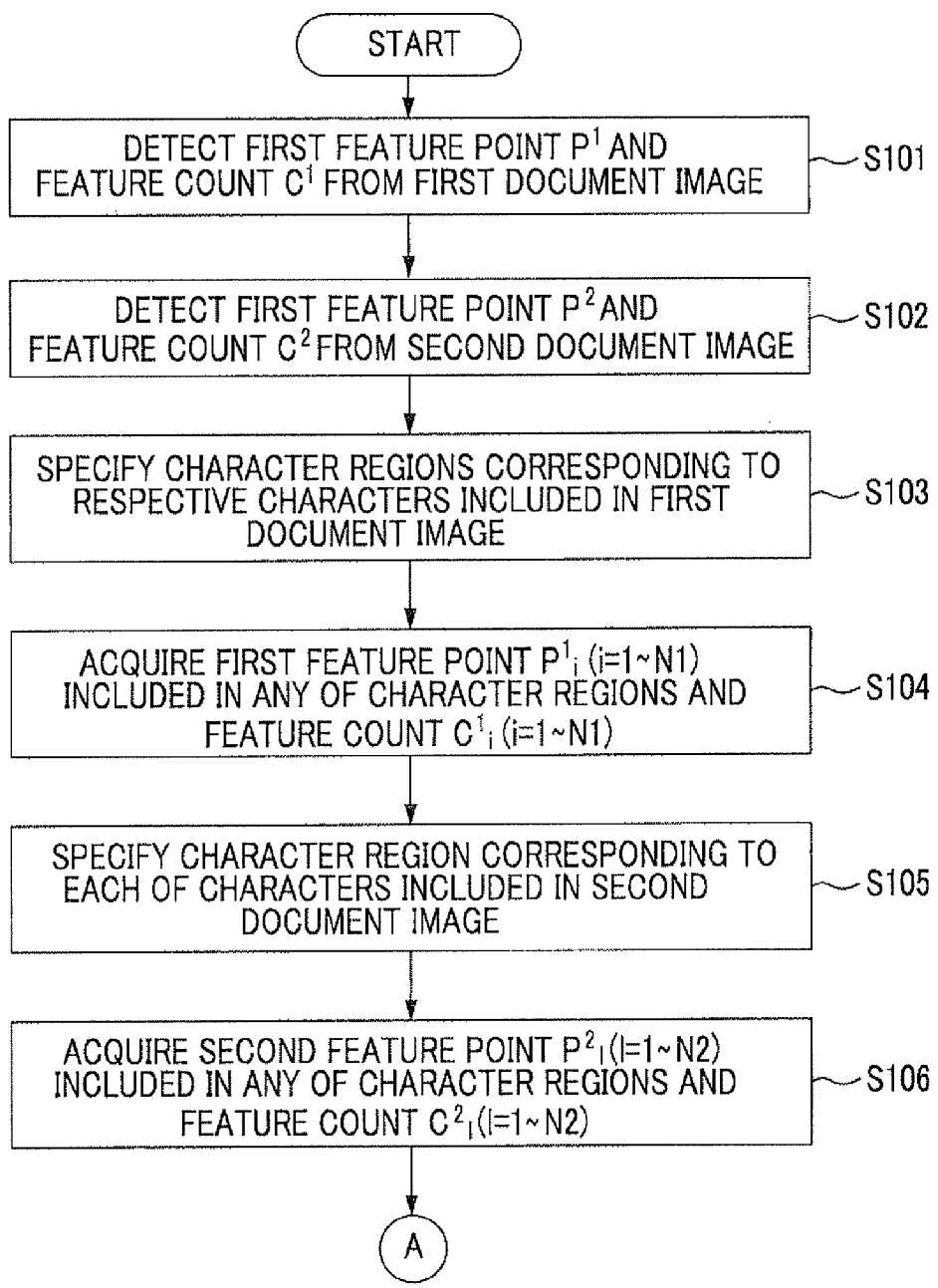
FIG. 4A is a flowchart illustrating the process performed by the image processing apparatus.

FIGS. 4A, 4B, and 4C are flowcharts illustrating the process executed by the image processing apparatus 2. The process illustrated in the drawings is executed when the control unit 4 operates in accordance with the program.

Figure 5A:
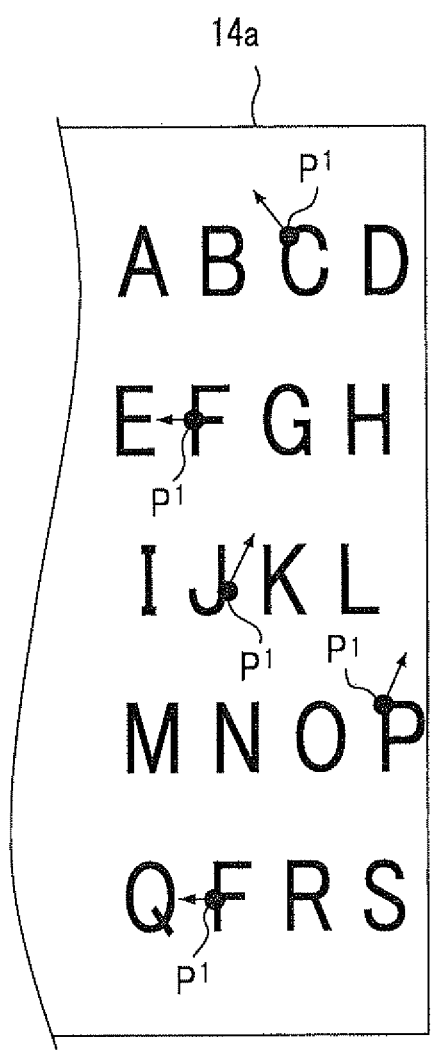
FIG. 5A is a diagram illustrating first feature points.

First, the control unit 4 detects plural feature points $P^1$ (hereinafter referred to as first feature points $P^1$) from the first document image 14a and feature counts $C^1$ representing the image features at the respective feature points $P^1$ (S101) and stores the coordinates of the first feature points $P^1$ and the feature counts $C^1$ in the main memory 6. In the present exemplary embodiment, the control unit 4 detects the first feature points $P^1$ and the feature counts $C^1$ by a scale-invariant feature transform (SIFT) method. The feature counts $C^1$ are so-called SIFT feature counts and are expressed as a multi-dimensional vector of 128-dimensions. The multi-dimensional vector is invariant to rotation and scaling of an image. Moreover, a representative direction indicated by the multi-dimensional vector is referred to as an orientation. The orientation is expressed as a 2-dimensional vector. FIG. 5A illustrates the first feature points $P^1$. The arrows represent orientations.

Figure 5B:
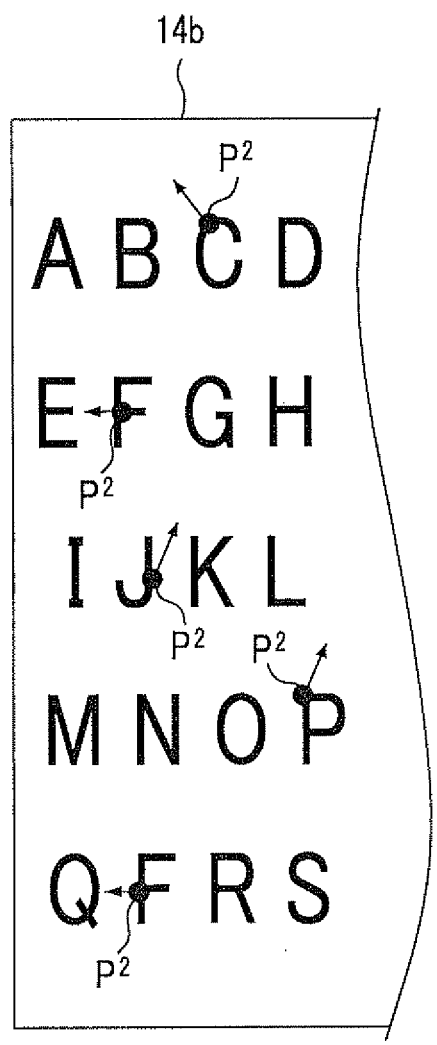
FIG. 5B is a diagram illustrating second feature points.

Moreover, in a manner similar to step S101, the control unit 4 detects plural feature points $P^2$ (hereinafter referred to as second feature points $P^2$) from the second document image 14b and feature counts $C^2$ representing the image features at the respective feature points $P^2$ (S102) and stores the coordinates of the second feature points $P^2$ and the feature counts $C^2$ in the main memory 6. FIG. 5B illustrates the second feature points $P^2$.

Moreover, the control unit 4 performs a known character region detecting process (for example, morphology process) to specify character regions corresponding to respective characters included in the first document image (S103). For example, the control unit 4 specifies a region occupied by a circumscribed rectangle of a certain character as a character region corresponding to the character. Moreover, the control unit 4 recognizes respective characters included in the first document image.

Moreover, the control unit 4 reads first feature points $P^1_i$ (i=1 to N1) included in any of the character regions and feature counts $C^1_i$ at the first feature points $P^1_i$ from the main memory 6 (S104). The first feature points $p^1_i$ (i=1 to N1) correspond to "plural first feature points."

Moreover, in a manner similarly to step S103, the control unit 4 specifies character regions corresponding to respective characters included in the second document image 14b (S105). Moreover, the control unit 4 (second feature acquiring unit) reads second feature points $P^2_l$ (l=1 to N2) included in any of the character regions and feature counts $C^2_l$ at the second feature point $P^2_l$ from the main memory 6 (S106). The second feature points $P^2_l$ (l=1 to N2) correspond to "plural second feature points."

Moreover, the control unit 4 executes the following processes with respect to each of the first feature points $P^1_i$ as processing targets. The first feature point $P^1_i$ serving as a processing target corresponds to a "target first feature point."

That is, the control unit 4 (first specifying unit) specifies second feature point candidates $P^2_j$ serving as candidates for the second feature point $P^2$ corresponding to the first feature point $P^1_i$ among the plural second feature points $P^2_l$ (S107). Specifically, the control unit 4 calculates a Euclidean distance between the feature count $C^2_l$ (the multi-dimensional vector) at the second feature point $P^2_l$ and the feature count $C^1_i$ (the multi-dimension vector) with respect to each of the second feature points $P^2_l$ and specifies the second feature points $P^2_l$ of which the Euclid distance is a threshold value or less as the second feature point candidates $P^2_j$.

Moreover, the control unit 4 determines whether the number N3 of second feature point candidates $P^2_j$ is "1" (S108). When the number N3 of second feature point candidates $P^2_j$ is "1" (S108: Yes), the control unit 4 sets the second feature point candidate $P^2_j$ as the second feature point $P^2$ corresponding to the first feature point $P^1_i$ (S120). Specifically, the control unit 4 treats the first feature point $P^1_i$ and the second feature point candidate $P^2_j$ as a group.

On the other hand, when plural second feature point candidates $P^2_j$ are specified (S108: No), the control unit 4 specifies a character region including a different character from the character region including the first feature point $P^1_i$ among character regions positioned within a predetermined distance from the character region including the first feature point $P^1_i$ (S109). For example, in the case of the first document image 14a illustrated in FIG. 5A, it is assumed that the first feature point $P^1$ detected from the character "F" on the upper side is the target first feature point $P^1_i$ to be processed. In this case, two second feature points $P^2$ detected from two characters "F" included in the second document image 14b are specified as the second feature point candidates $P^2_j$. Thus, in step S109, character regions surrounding the respective characters "A", "B", "C", "E", "G", "I", "J", and "K" different from the character "F" are specified among the character regions (that is, the character regions surrounding the respective characters "A", "B", "C", "E", "G", "I", "J", and "K") positioned around the character region surrounding the character "F" on the upper side. As a result, character regions positioned on different rows or columns from the character region surrounding the character "F" on the upper side are also specified.

Moreover, the control unit 4 specifies first feature points $P^1_k$ (k=1 to N4) included in any of the character regions specified in S109 among the plural first feature points $P^1_i$ (S110). For example, in the case of FIG. 5A, the first feature point $P^1$ detected from the character "C" and the first feature point $P^1$ detected from the character "C" are specified as the first feature points $P^1_k$ (other first feature point).

Moreover, the control unit 4 initializes the evaluation values $V_j$ (j=1 to N3) of the respective second feature point candidates $P^2_j$ (j=1 to N3) to "0" (S111) and executes the following processes with respect to each of the first feature points $P^1_k$.

That is, the control unit 4 (second specifying unit) performs the same process as step S107 to specify second feature point candidates $P^2_m$ (m=1 to N5) serving as the candidates for the second feature point $P^2$ corresponding to the first feature point $P^1_k$ among the plural second feature points $P^2_l$ (S112). Moreover, the control unit 4 calculates a directional vector $V_{ik}$ extending from the first feature point $P^1_i$ (target first feature point) to the first feature point $P^1_k$ (other first feature point)

(S113). Moreover, the control unit 4 also calculates the distance $d_{ik}$ between the first feature point $P^1_i$ and the first feature point $P^1_k$ in step S113.

Figure 6:
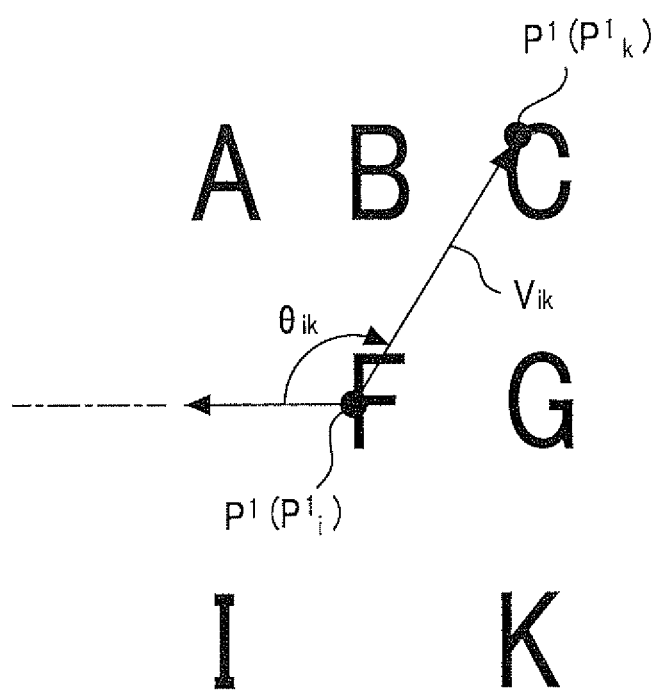
FIG. 6 is a diagram illustrating a directional vector and an angle.

Moreover, the control unit 4 calculates the clockwise angle $\theta_{ik}$ of the directional vector $V_{ik}$ in the orientation indicated by the feature count $C^1_i$ at the first feature point $P^1_i$ (target first feature point) (S114). FIG. 6 illustrates the directional vector $V_{ik}$ and the angle $\theta_{ik}$ when the character "F" on the upper side of the first document image 14a is the first feature point $P^1_i$, and the character "C" on the top right side of the character "F" is the first feature point $P^1_k$. The bold arrow illustrated in FIG. 6 shows an orientation.

Moreover, the control unit 4 executes the following processes with respect to each of the combinations of the second feature point candidates $P^2_j$ (j=1 to N3) and the second feature point candidates $P^2_m$ (m=1 to N5).

That is, the control unit 4 calculates a directional vector $V_{jm}$ extending from the second feature point candidate $P^2_j$ (the second feature point candidate of the target first feature point) to the second feature point candidate $P^2_m$ (the second feature point candidate of another first feature point) (S115). Moreover, the control unit 4 also calculates the distance $d_{jm}$ between the second feature point candidate $P^2_j$ and the second feature point candidate $P^2_m$ in step S115.

Moreover, the control unit 4 calculates the clockwise angle $\theta_{jm}$ of the directional vector $V_{jm}$ in the orientation indicated by the feature count $C^2_j$ at the second feature point candidate $P^2_j$ (the second feature point candidate of the target first feature point) (S116).

Moreover, the control unit 4 determines whether the difference $\Delta\theta$ between the angle $\theta_{ik}$ and the angle $\theta_{jm}$ is a threshold angle or less, and the difference $\Delta d$ between the distance $d_{ik}$ and the distance $d_{jm}$ is a threshold distance or less (S117). When the difference $\Delta\theta$ is a threshold angle or less and the difference $\Delta d$ is a threshold distance or less (S117: Yes), the control unit 4 (evaluating unit) increases the evaluation value $V_j$ by "1" (S118). The control unit 4 may determine in step S117 only whether the difference $\Delta\theta$ between the angle $\theta_{ik}$ and the angle $\theta_{jm}$ is a threshold angle or less. When the difference $\Delta\theta$ between the angle $\theta_{ik}$ and the angle $\theta_{jm}$ is a threshold angle or less, the control unit 4 may increase the evaluation value $V_j$ by "1" in step S118.

In this way, when the evaluation values $V_j$ are determined for the respective second feature point candidates $P^2_j$ (j=1 to N3), the control unit 4 (setting unit) sets the second feature point candidate $P^2_j$ having the largest evaluation value $V_j$ as the second feature point $P^2$ corresponding to the first feature point $P^1_i$ (S119). That is, the control unit 4 treats the first feature point $P^1_i$ and the second feature point candidate $P^2_j$ having the largest evaluation value $V_j$ as a group.

In this way, when the corresponding second feature points $P^2$ are set for the respective first feature points $P^1_i$, the control unit 4 reads the first feature point $P^1_n$ (n=1 to N6) which is not included in any character region and the feature count $C^1_n$ at the first feature point $P^1_n$ from the main memory 6 (S121). Moreover, the control unit 4 reads the second feature point $P^2_q$ (q=1 to N7) which is not included in any character region and the feature count $C^2_q$ at the second feature point $P^2_q$ from the main memory 6 (S122). The steps S121 and S122 aim to acquire feature points extracted from a region where a figure is drawn, for example.

Moreover, the control unit 4 executes the following processes with respect to each of the first feature points $P^1_n$.

That is, the control unit 4 specifies the second feature point candidates $P^2$ of the first feature point $P^1_n$ from plural second feature points $P^2_q$ in a manner similarly to step S107 (S123). Since plural feature points exhibiting similar image features are not extracted from a region where a figure is drawn, one second feature point candidate $P^2$ is generally specified for one first feature point $P^1_n$ in step S123.

Therefore, the control unit 4 sets the second feature point candidate $P^2$ specified in step S123 as the second feature point $P^2$ corresponding to the first feature point $P^1_n$ (S124).

When the corresponding second feature points $P^2$ are determined for the respective first feature points $P^1$ extracted from the first document image 14a by the processes illustrated in FIGS. 4A to 4O, the control unit 4 calculates deformation parameters such that the respective first feature points $P^1$ are made identical to the corresponding second feature points $P^2$. Moreover, the control unit 4 deforms the first document image 14a using the deformation parameters and generates a combined document image (see FIG. 20) by combining the transformed first document image 14a with the second document image 14b.

In the image processing apparatus 2, the second feature points $P^2$ exhibiting image features similar to each of the respective first feature points $P^1$ are specified as the second feature point candidates. When plural second feature point candidates are present for a certain first feature point $P^1$ (hereinafter referred to as a target first feature point $P^1$), the relative position of the other first feature point $P^1$ to the target first feature point $P^1$ is compared with the relative position of "second feature point candidate of the other first feature point $P^1$" to "second feature point candidate of the target first feature point $P^1$." The second feature point $P^2$ corresponding to the target first feature point $P^1$ is selected from the second feature point candidates of the target first feature point $P^1$ based on the comparison result. Thus, even when plural feature points exhibiting features similar to the feature points extracted from the first document image 14a are extracted from the second document image 14b, one feature point corresponding to the feature point extracted from the first document image 14a is specified with high accuracy.

Moreover, the relative position of the other first feature point $P^1$ to the target first feature point $P^1$ is expressed as a rotation angle of "the direction from the target first feature point $P^1$ to the other first feature point $P^1$" with respect to "the orientation at the target first feature point $P^1$." Moreover, the relative position of "the second feature point candidate of the other first feature point $P^1$" to "the second feature point candidate of the target first feature point $P^1$" is expressed as a rotation angle of "the direction from the second feature point candidate of the target first feature point $P^1$ to the second feature point candidate of the other first feature point $P^1$" to "the orientation at the second feature point candidate of the target first feature point $P^1$." Thus, the relative position of the other first feature point $P^1$ to the target first feature point $P^1$ is evaluated regardless of the direction of the first document image 14a. Similarly, the relative position of "the second feature point candidate of the other first feature point $P^1$" to "the second feature point candidate of the target first feature point $P^1$" is evaluated regardless of the direction of the second document image 14b. In this respect, one feature point corresponding to the feature point extracted from the first document image 14a is specified with high accuracy.

If the direction of the first document image 14a is the same as the direction of the second document image 14b, the directional vector $V_{ik}$ (see step S113) may be used as the information representing the relative position of the first feature point $P^1_k$ to the first feature point $P^1_i$, and the directional vector $V_{jm}$ (see step S115) may be used as the information representing "the relative position of the second feature point candidate $P^2_m$ of the first feature point $P^1_k$ to the second feature point candidate $P^2_j$ of the first feature point $P^1_i$." In this case, the control unit 4 may determine in step S117 whether the angle between the directional vector $V_{ik}$ and the directional vector $V_{jm}$ is a threshold value or less, and execute the process of step S118 when the angle between the directional vector $V_{ik}$ and the directional vector $V_{jm}$ is a threshold value or less.

Figure 7:
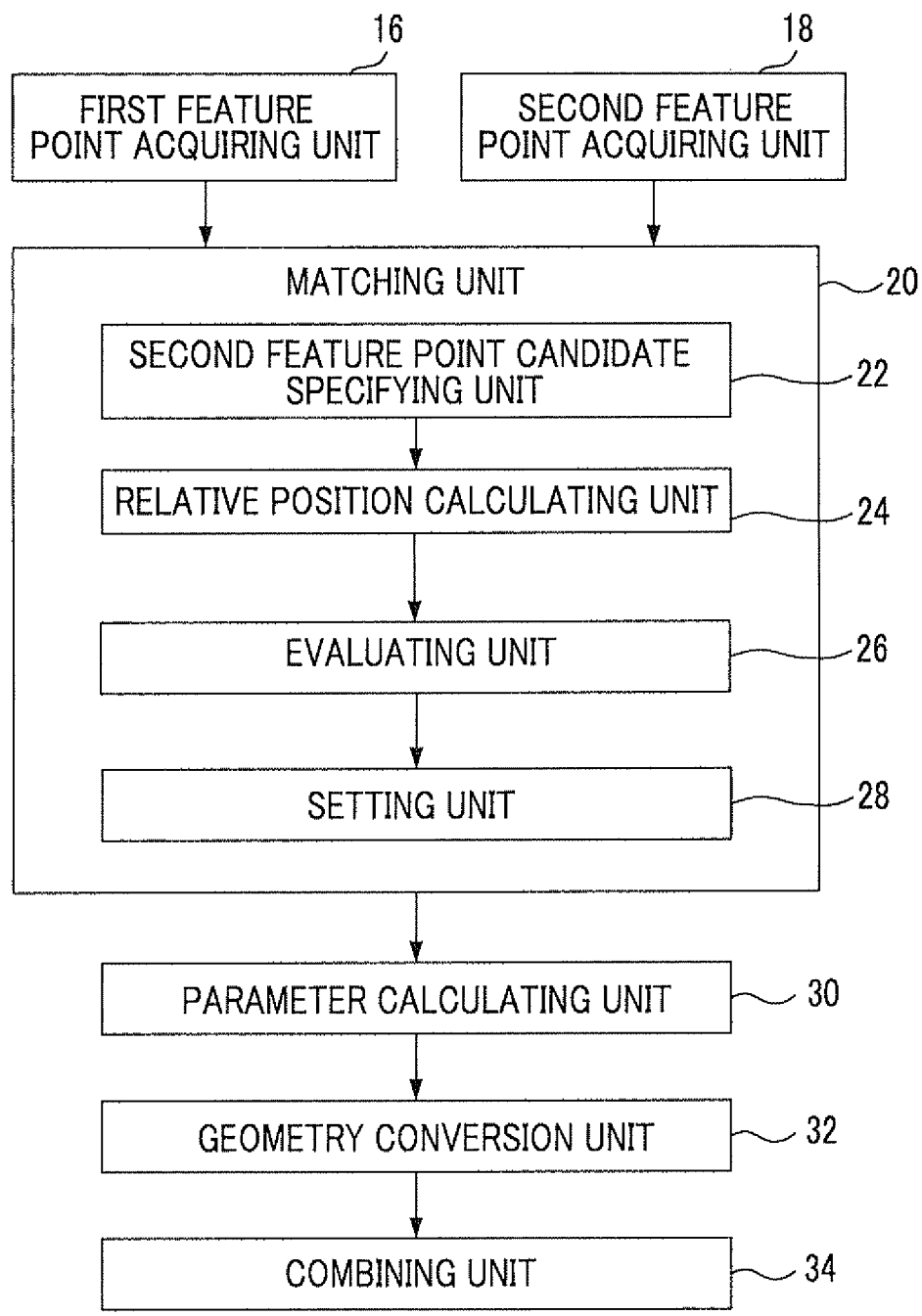
FIG. 7 is a functional block diagram illustrating functions realized by the image processing apparatus.

FIG. 7 is a functional block diagram illustrating the functions realized by the image processing apparatus 2. As illustrated in FIG. 7, in the image processing apparatus 2, a first feature point acquiring unit 16, a second feature point acquiring unit 18, a matching unit 20, a second feature point candidate specifying unit 22, a relative position calculating unit 24, an evaluating unit 26, a setting unit 28, a parameter calculating unit 30, a geometry conversion unit 32, and a combining unit 34 are realized. These functions are realized when the control unit 4 operates in accordance with the program.

The first feature point acquiring unit 16 acquires plural first feature points $P^1_i$ included in any of the character regions in the first document image 14a and feature counts $C^1_i$ at these first feature points $P^1_i$ (see step S104). Moreover, the second feature point acquiring unit 18 acquires plural second feature points $P^2_j$ included in any of the character regions in the second document image 14b and feature counts $C^2_j$ at these second feature points $P^2_j$ (see step S106).

The matching unit 20 sets one second feature point $P^2$ of the plural second feature points $P^2_j$ as one second feature point $P^2$ corresponding to the first feature point $P^1_i$ with respect to each of the first feature points $P^1_i$. That is, the matching unit 20 executes the following processes with respect to the respective one of the first feature points $P^1_i$ as the target first feature point $P^1_i$.

That is, the second feature point candidate specifying unit 22 specifies the second feature point candidate $P^2_j$ of the target first feature point $P^1_i$ based on the result of comparison between the feature count $C^1_i$ at the target first feature point $P^1_i$ and the feature count $C^2_j$ at each of the respective second feature points $P^2_j$ (see step S107). Moreover, the second feature point candidate specifying unit 22 specifies the second feature point candidate $P^2_m$ of "the first feature point $P^1_k$ included in a different character region from the target first feature point $P^1$ among the plural first feature points $P^1_i$" based on the result of comparison between the feature count $C^1_k$ at the first feature point $P^1_k$ and the feature count $C^2_j$ at each of the respective second feature points $P^2_j$ (see step S112).

Moreover, the relative position calculating unit 24 calculates a relative position of the first feature point $P^1_k$ to the target first feature point $P^1_i$. Moreover, the relative position calculating unit 24 also calculates a relative position of "the second feature point candidate $P^2_m$ of the first feature point $P^1_k$" to "the second feature point candidate $P^2_j$ of the target first feature point $P^1_i$". In the present exemplary embodiment, the relative position calculating unit 24 calculates the angle $\theta_{ik}$ and the angle $\theta_{jm}$ (see steps S114 and S116).

Moreover, the evaluating unit 26 generates an evaluation value $V_j$ on evaluation of the second feature point candidate $P^2_j$ of the target first feature point $P^1_i$ based on the result of comparison between both relative positions (see steps S117 and S118). Moreover, the setting unit 28 sets the second feature point candidate $P^2_j$ as the second feature point $P^2$ corresponding to the target first feature point $P^1_i$ in accordance with the evaluation value $V_j$ (see step S119)

The parameter calculating unit 30 calculates deformation parameters (geometry conversion parameters) for deforming the first document image 14a so that the respective first feature points $P^1$ are made identical to the corresponding second feature points $P^2$. Moreover, the geometry conversion unit 32 converts the geometry of the first document image 14a using the deformation parameters, and the combining unit 34 generates a combined document image (see FIG. 2C) by combining the first document image 14a of which the geometry is converted with the second document image 14b.

The exemplary embodiment of the present invention is not limited to the exemplary embodiment described above.

For example, the feature count may be a SURF (Speeded Up Robust Features) feature count acquired by a SURF method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
   a first specifying unit that is configured to specify second feature point candidates as the candidates for a second feature point corresponding to a target first feature point, which is one of a plurality of first feature points extracted from a first image including a plurality of character regions corresponding to characters, among a plurality of second feature points extracted from a second image based on the result of comparison between a feature count representing image features at the target first feature point and a feature count representing image features at each of the plurality of second feature points;
   a second specifying unit that is configured to specify second feature point candidates among the plurality of second feature points with respect to another first feature point included in a character region different from the target first feature point among the plurality of first feature points based on the result of comparison between a feature count representing image features at the other first feature point and the feature count representing image features at each of the plurality of second feature points;
   an evaluating unit that is configured to generate evaluation information on evaluation of each of the second feature point candidates of the target first feature point based on the result of comparison between the relative position of the other first feature point to the target first feature point and the relative position of each of the second feature point candidates of the other first feature point to each of the second feature point candidates of the target first feature point; and
   a setting unit that is configured to set one of the second feature point candidates of the target first feature point in accordance with the evaluation information as the second feature point corresponding to the target first feature point,
   wherein at least one of the above units are implemented by a processor.

2. The image processing apparatus according to claim 1, wherein
   the evaluating unit generates the evaluation information based on the result of comparison between an angle of a direction from the target first feature point to the other first feature point with respect to a representative direction indicated by the feature count at the target first feature point and an angle of a direction from one of the second feature point candidates of the target first feature point to one of the second feature point candidates of the other first feature point with respect to a representative direction indicated by the feature count at the second feature point candidate of the target first feature point.

3. The image processing apparatus according to claim 1, wherein
the other first feature point is a first feature point included in a character region positioned in a row or a column different from the character region including the target first feature point.

4. The image processing apparatus according to claim 2, wherein
the other first feature point is a first feature point included in a character region positioned in a row or a column different from the character region including the target first feature point.

5. The image processing apparatus according to claim 1, wherein
the other first feature point is a first feature point included in a character region corresponding to a different type of character from the character region including the target first feature point.

6. The image processing apparatus according to claim 2, wherein
the other first feature point is a first feature point included in a character region corresponding to a different type of character from the character region including the target first feature point.

7. A non-transitory computer readable medium storing a program for causing a computer to function as:
a first specifying unit that is configured to specify second feature point candidates as the candidates for a second feature point corresponding to a target first feature point, which is one of a plurality of first feature points extracted from a first image including a plurality of character regions corresponding to characters, among a plurality of second feature points extracted from a second image based on the result of comparison between a feature count representing image features at the target first feature point and a feature count representing image features at each of the plurality of second feature points;
a second specifying unit that is configured to specify second feature point candidates among the plurality of second feature points with respect to another first feature point included in a character region different from the target first feature point among the plurality of first feature points based on the result of comparison between a feature count representing image features at the other first feature point and the feature count representing image features at each of the plurality of second feature points;
an evaluating unit that is configured to generate evaluation information on evaluation of each of the second feature point candidates of the target first feature point based on the result of comparison between the relative position of the other first feature point to the target first feature point and the relative position of each of the second feature point candidates of the other first feature point to each of the second feature point candidates of the target first feature point; and
a setting unit that is configured to set one of the second feature point candidates of the target first feature point in accordance with the evaluation information as the second feature point corresponding to the target first feature point.

8. An image processing method comprising :
a first specifying step of specifying second feature point candidates as the candidates for a second feature point corresponding to a target first feature point, which is one of a plurality of first feature points extracted from a first image including a plurality of character regions corresponding to characters, among a plurality of second feature points extracted from a second image based on the result of comparison between a feature count representing image features at the target first feature point and a feature count representing image features at each of the plurality of second feature points;
a second specifying step of specifying second feature point candidates among the plurality of second feature points with respect to another first feature point included in a character region different from the target first feature point among the plurality of first feature points based on the result of comparison between a feature count representing image features at the other first feature point and the feature count representing image features at each of the plurality of second feature points;
an evaluating step of generating evaluation information on evaluation of each of the second feature point candidates of the target first feature point based on the result of comparison between the relative position of the other first feature point to the target first feature point and the relative position of each of the second feature point candidates of the other first feature point to the second feature point candidates of the target first feature point; and
a setting step of setting one of the second feature point candidates of the target first feature point in accordance with the evaluation information as the second feature point corresponding to the target first feature point.

* * * * *